(12) United States Patent  
Plichon et al.

(10) Patent No.: US 12,022,981 B2  
(45) Date of Patent: Jul. 2, 2024

(54) VERSATILE MOLD

(71) Applicant: SEB S.A., Ecully (FR)

(72) Inventors: Stéphane Plichon, Allonzier-la-Caille (FR); Stéphane Suchet, Marcellaz-Albanais (FR)

(73) Assignee: SEB S.A. (FR)

( * ) Notice: Subject to any disclaimer, the term of this patent is extended or adjusted under 35 U.S.C. 154(b) by 199 days.

(21) Appl. No.: 17/801,092

(22) PCT Filed: Feb. 8, 2021

(86) PCT No.: PCT/EP2021/052934  
§ 371 (c)(1),  
(2) Date: Aug. 19, 2022

(87) PCT Pub. No.: WO2021/165079  
PCT Pub. Date: Aug. 26, 2021

(65) Prior Publication Data  
US 2023/0073336 A1    Mar. 9, 2023

(30) Foreign Application Priority Data  
Feb. 21, 2020 (FR) ...................................... 2001765

(51) Int. Cl.  
*A21B 3/13* (2006.01)  
*A47J 37/01* (2006.01)  
*A47J 43/20* (2006.01)

(52) U.S. Cl.  
CPC ............... *A47J 43/20* (2013.01); *A21B 3/132* (2013.01); *A47J 37/01* (2013.01)

(58) Field of Classification Search  
CPC ............ A21B 3/132; A47J 37/01; A47J 43/20  
See application file for complete search history.

(56) References Cited

U.S. PATENT DOCUMENTS 10,575,678 B1 *   3/2020  Anderson ............... A47J 9/007  
2011/0123699 A1   5/2011  Beltran

FOREIGN PATENT DOCUMENTS

DE            20211821 U1     1/2003

OTHER PUBLICATIONS

International Search Report for Application No. PCT/EP2021/052934 mailed Mar. 25, 2021, 2 pages.

* cited by examiner

*Primary Examiner* — James Sanders  
(74) *Attorney, Agent, or Firm* — Lerner David LLP

(57) ABSTRACT

The subject-matter of the invention is a mold intended for preparing food, in particular pastries, comprising—a holder comprising a receiving structure, enhancers and at least one through-opening having an edge;
- at least one type A removable container intended to be inserted into the opening;
- at least one type B removable container intended to be inserted into the opening;

the type A and type B removable containers having different geometries and cavities with different volumes.

14 Claims, 13 Drawing Sheets

VERSATILE MOLD

CROSS-REFERENCE TO RELATED APPLICATIONS

The present application is a national phase entry under 35 U.S.C. § 371 of International Application No. PCT/EP2021/052934 filed Feb. 8, 2021, which claims priority from French Application No. 2001765 filed Feb. 21, 2020, all of which are hereby incorporated herein by reference.

TECHNICAL FIELD

The present invention relates to the field of molds for food use, and in particular that of molds for baking liquid food preparations, such as pastry dough, muffin batter.

It should be noted that in this document, the terms "longitudinal," "transversal," "perpendicular," "parallel," "rotation," "horizontal," "vertical," "lower," "upper," "high," "low," "separating," "coaxial," "convex," "concave," "flat" used to describe the invention, refer to this invention when in use, when set on a horizontal surface.

PRIOR ART

In the field of food preparation, and more particularly of baking, molds are commonly used to shape and bake food such as cakes.

Conventional molds, known as muffin pans, have several receptacles or cups arranged on a holder, the whole forming a single mold with several cavities for receiving the pastry. Conventionally, these one-piece molds are made of stamped sheet metal, which may be covered with a non-stick coating. These molds come in a multitude of shapes. The advantage of multi-cup molds is that several cakes or recipes can be made simultaneously by filling all the cavities in the mold.

However, the drawback of these multi-cup molds is that unmolding is difficult because the cups are incorporated into the holder. The cups therefore cannot be handled separately but only simultaneously.

There are also multi-cup molds where each cup can be removed from a tray for easier unmolding. However, the drawback of these molds is that they only have one type of cup per holder and therefore have a limited variety of shapes. Indeed, the user cannot vary the cups and is forced to use the cup that corresponds to the holder. The user therefore has a limited number of choices.

The present invention therefore aims to resolve all or part of the aforementioned drawbacks, in particular by proposing a mold with several different cups with different shapes and enabling these cups to be arranged as the user wishes in the holder, thus offering greater freedom of use.

The inventors have thus demonstrated that it is possible to use multi-cup molds whose cavities have different shapes, with the common feature of having equivalent dimensions, width and length or diameter over a given section.

The invention provides at least one of the decisive advantages described below.

Advantageously, the mold according to the invention makes it possible to use cups of different shapes and volumes with the same holder. This allows the user to consider all kinds of cups made of different materials for different recipes. It is possible to imagine shapes that, as such, are not stable on a worktop and topple over, such as hemispheres with a spherical or cylindrical base (mini-logs) that cannot be arranged as such in the oven.

Another advantage of the invention is that placement in the oven and removal from the oven is facilitated by the fact that the assembly tray holds all of the elements together.

Another advantage of the present invention is that each user around the kitchen table can season their dish in its cup to their own taste. Different shapes of cakes can be made in the same batch.

Another advantage of the present invention is that each individual cup is removable, which makes handling much easier compared to handling the entire mold with all its cups. Also advantageously, the cups can be stacked together for optimized storage of this type of mold.

PRESENTATION OF THE INVENTION

The subject-matter of the invention is a mold intended for preparing food, in particular pastries, comprising
- a holder comprising a receiving structure, enhancers and at least one through-opening having an edge;
- at least one type A removable container intended to be inserted into the opening;
- at least one type B removable container intended to be inserted into the opening;
- the type A and B containers comprising a border and a wall together forming a cavity for holding food;
- the removable type A and type B containers are of different geometry and have cavities with different volumes;
- and the same through-opening has both straight and curved portions, type A containers being able to cooperate with the straight portions and type B containers being able to cooperate with the curved portions of the edge of the through-opening in order to partially support the containers on the edge.

Thus, the holder comprises a receiving structure intended to receive, group together and support the containers, which are themselves intended to receive the food preparation. The structure allows all the elements of the mold to be secured to one another, particularly the containers. The holder and the container or containers are two separate elements, interlocking with one another. Due to shape of its edge which is both straight and curved, the through-opening makes it possible to provide a variable opening surface when moving along the edge, allowing the same opening to accommodate different shaped containers without the need for adapters. Indeed, due to shape of its edge which is both straight and curved, the through-opening does not require the use of external adapters narrowing the area of the opening surface in order to adapt it to different container shapes. Advantageously, the through-opening of the mold holder according to the invention is modular and is suitable for any combination of type A and B containers due to the shape of its edge. The holder has enhancers that make it possible to raise the bottom of the containers and keep them away from the supporting surface on which the holder is set, such as a worktop or a baking tray or rack in an oven. Thus, the bottom wall of the containers does not come into contact with the worktop or with the oven racks when the containers are placed in the holder. Since direct contact with the oven rack is avoided, there is no direct transmission of heat by the metal elements of the oven, which could spread through the bottom wall and cause uneven baking. Thus, the risk of overcooking in the bottom of the containers is avoided. This advantageous arrangement allows the heat to spread all around the available surface of the container. Thus, baking takes place by heat diffused by the ambient air in the oven around the containers, which helps ensure that the food is evenly baked.

According to another feature of the invention, the straight portions and the curved portions are present simultaneously on the edge of said through-opening in the same plane, which is a plane parallel to or coincident with the plane containing the receiving structure. Thus, the through-opening can simultaneously receive the type A and B containers that may be intended to be inserted into the same opening.

According to another feature of the invention, the edge of said through-opening has at least 4 straight portions alternating with at least 4 curved portions.

According to another feature of the invention, the edge of said through-opening has at least 4 straight portions alternating with at least 6 curved portions.

According to another feature of the invention, the edge of said through-opening has at least 6 straight portions alternating with at least 6 curved portions.

According to another feature of the invention, the edge of said through-opening has at least 8 straight portions alternating with at least 9 curved portions.

According to another feature of the invention, the curved portions are concave. These curved portions may all be the same size on the edge of the through-opening or have different sizes. A user will see the concave shape of the curved portions by placing their eye at the geometric center of the through-opening.

According to another feature of the invention, the straight portions and the curved portions are arranged alternately.

According to another feature of the invention, the wall of each type A or type B container has a discontinuous line of cooperation where a part of the container cooperates with a part of the edge of the through-opening, in order to place the container partially in contact with the edge. The container's discontinuous line of cooperation cooperates in part with the perimeter of the edge of the opening but sufficiently to hold the container. Thus, the same through-opening can accommodate different shapes of containers without the use of adapter arches, in order to provide modularity. Gravity ensures that the containers settle into the through-openings and cooperate with the discontinuous line of cooperation.

According to another feature of the invention, the mold according to the invention further comprises at least one type C and/or type D and/or type E container all different from one another, and different from the type A and B containers.

According to another feature of the invention, the mold according to the invention comprises at least one container of type A and type B, and/or type C and/or type D and/or type E, of which at least two are different; advantageously, at least three of them are different.

According to another feature of the invention, the removable container, regardless of its type, may have a single wall, the container preferentially being hemispherical in shape.

According to another feature of the invention, the removable container, regardless of its type, may have a wall composed of a side wall and a bottom wall, the container preferentially having a frustoconical or truncated pyramid shape.

According to another feature of the invention, the type A or type B container has a parallelepipedal section. The user can thus prepare pastries in the form of cakes or mini-cakes.

According to another feature of the invention, the type A or type B container may have a circular section. The user can thus prepare pastries in the form of muffins or fluted pastries.

According to another feature of the invention, the type A or type B container having a circular section cooperates only with the curved portions.

According to another feature of the invention, the through-opening can receive type A, type B and other types of containers. The user can thus use different cups without being limited by the shape of the through-openings, demonstrating the versatility of the mold.

According to another feature of the invention, the mold comprises at least two through-openings (5), each of the through-openings receiving type A containers (7) of parallelepipedal section or type B containers (7) of at least partly circular section. This allows the user to prepare and bake muffin-shaped and cake-shaped pastries simultaneously.

According to another feature of the invention, the type A and type B containers may be of different shapes and capacities.

According to another feature of the invention, each type A or type B container has a tapering cross-section, between a minimum and a maximum, covering a variable area along a longitudinal axis (A) of the container, such that each container has, for example, a substantially frustoconical, spherical or truncated pyramid geometry.

This geometric arrangement makes unmolding easier but also makes it possible to facilitate the circulation of heat around the containers.

According to another feature of the invention, each type A or B container has an unmolding angle $\alpha$ of at least 5°. Thus, the walls of the container have a slope angle which facilitates unmolding when the container is turned over with its opening and cavity facing downwards.

According to another feature of the invention, the receiving structure is a tray. The user can thus fill all the cups with a liquid preparation and arrange the filled cups in the holder without spilling them.

According to another feature of the invention, each cup is separate and can be taken out individually because it is removable, which makes handling much easier compared to handling the entire mold with all its cups. The user can thus easily grasp one cup, tilt it and fill it with a ladle, for example.

According to another feature of the invention, each container comprises a locking system with the receiving tray. This locking system can be in the form of a notch (for example, a slot on the side wall for holding on the holder) or a system of studs and bayonet couplings (for example, short and long studs with notched support to cooperate with bayonet), which enables the container to be stabilized in case of transverse or vertical movements of the holder.

According to another feature of the invention, the edge of the through-opening has an arrangement facilitating accommodation of the container, such as a rounded edge or a sloping face.

According to another feature of the invention, the holder and containers of any type are made of a rigid material that holds its shape, such as metal, steel. It may also be foreseen that the holder and containers are made of stainless steel, silicon or aluminum. Advantageously the holder and containers may also be covered with a non-stick coating. It can also be foreseen that the holder and the containers are made of different materials, such as a metal or wood holder and glass or ceramic containers.

According to another feature of the invention, the containers have an upper gripping zone located advantageously above the tray, making it easier to grip the individual mold or cup and avoiding spills and finger burns. A user wearing oven mitts and whose movements are restricted will be able to easily grasp the cup by its upper gripping zone even if the mold is hot.

According to another feature of the invention, the containers have a lower stability zone under the tray and capable of passing through the opening of the tray. The center of gravity of the containers is located above the tray. The user can thus fill all the cups with a liquid preparation and arrange the filled cups in the holder without spilling them. When the container is inserted into the opening of the mold holder, the stability zone is then no longer in contact with the worktop or baking tray but is only in contact with the mold holder via the annular line of cooperation.

According to another feature of the invention, the annular line of cooperation cooperates in whole or in part with the edge of the opening.

According to another feature of the invention, the only contact surface of the removable container with the holder is the annular line of cooperation which cooperates in whole or in part with the edge of the opening, the container not being in contact with the surface of the receiving structure. The only contact of the container with the holder is the edge of the openings.

According to another feature of the invention, the enhancers are arranged laterally on each side of the holder. Advantageously, the enhancers support the weight of the receiving structure of the mold according to the invention with or without the removable containers.

According to another feature of the invention, the enhancers are present on no more than two sides of the receiving structure, preferably facing one another, and the other two sides are left free to allow air to circulate.

According to another feature of the invention, the enhancers are substantially L-shaped with one enhancer leg resting on the worktop or the oven. The leg of the enhancer is advantageously arranged in a plane parallel to the plane containing the receiving structure.

According to another feature of the invention, the mold holder according to the invention with its receiving structure and enhancers is configured to raise the container with respect to the supporting surface on which the mold is set and to define an air blade between the bottom wall of the container and this supporting surface of the mold.

According to another feature of the invention, the mold holder according to the invention comprises an air circulation corridor arranged under the receiving structure. Such a configuration of the mold according to the invention, and in particular the presence of an air blade between the container and the surface on which the mold is placed, for example a worktop or the baking tray in the oven, makes it possible to sufficiently insulate the underside of the food preparation received in the container from the radiation coming from the bottom heating elements of the oven and thus to slow the baking and browning of the underside of the food preparation.

According to another feature of the invention, the enhancers have a height h3, this height h3 being greater than the height h2, the height h3 preferentially being at least 10% greater, preferably at least 15% greater than the value of the height h2. The height h3 corresponds to the sum of heights h2 and h4. Thus, the containers are raised and their bottom wall is kept free of any contact. The bottom wall is never in contact with any element once the container is installed on the mold holder. Thus, the bottom wall never touches any element of the oven or of the worktop or of the holder.

According to another feature of the invention, the mold according to the invention has a reservation zone with a height h4, extending from the supporting surface of the worktop to the bottom wall of the containers. The height h4 is present when the container is inserted into the through-opening. The height h4 is the difference h3−h2. Advantageously, this reservation zone accommodates the air blade and allows for air circulation, enabling the hot air to circulate better between the containers and to provide slow, even baking without creating a local hot spot by contact with the bottom wall, which would cause burned spots due to overheating.

According to another feature of the invention, the containers have a shape that enables them to be stacked in order to facilitate their storage.

According to another feature of the invention, the enhancers of the holder can be folded under the holder.

According to another feature of the invention, the enhancers of the holder can be disassembled and detached from the holder.

According to another feature of the invention, the receiving structure and the enhancers are a single continuous element.

BRIEF DESCRIPTION OF THE DRAWINGS

The following is a description of specific embodiments of the present invention, provided by way of non-limiting examples. It will assist in better understanding the purposes, aspects and advantages of this invention, with reference to the appended drawings in which:

FIG. 1 is a perspective view of an exemplary embodiment of the mold according to the invention with a first holder variant comprising removable type A, type B and type C containers.

FIG. 2 is a perspective view of an exemplary embodiment of the mold according to the invention with a first holder variant comprising removable type A and type B containers, arranged differently in the through-openings compared to FIG. 1.

FIG. 3 is a perspective view of an exemplary embodiment of the mold according to the invention with a first holder variant comprising removable containers of type A, type B, type C, arranged differently in the through-openings compared to FIG. 1.

FIG. 4 is a perspective view of an exemplary embodiment of the mold according to the invention with a first holder variant comprising removable type A, type C, type D and type E containers.

FIG. 5 is a bottom view of the mold depicted in FIG. 1.

FIG. 6 is a top view of the mold depicted in FIG. 1.

FIG. 7 is a perspective view of the first mold holder variant shown in FIGS. 1 to 6.

FIG. 8 is a sectional view of the first mold holder variant shown in FIGS. 1 to 6.

FIG. 9 is a top view of the first mold holder variant shown in FIGS. 1 to 6.

FIG. 10 is a perspective view of an exemplary embodiment of a mold according to the invention with a second holder variant comprising removable type A and type B containers.

FIG. 11 is a bottom view of a mold with the second holder variant as shown in FIG. 10 and comprising removable containers of type A, type B and type C, arranged like those in FIG. 1 in the through-openings.

FIG. 12 is a perspective view of an exemplary embodiment of the mold according to the invention with the second holder variant comprising removable containers of type A, type C, type D and type E.

FIG. 13 is a perspective view of the second mold holder variant illustrated in FIGS. 10, 11, 12, 14 and 15.

FIG. 14 is a sectional view of the second mold holder variant illustrated in FIGS. 10 to 15.

FIG. 15 is a top view of the second mold holder variant shown in FIGS. 10 to 14.

FIG. 16 is a perspective view of an exemplary embodiment of the mold according to the invention with a third holder variant comprising removable type A and type B containers.

FIG. 17 is a perspective view of an exemplary embodiment of the mold according to the invention with the third holder variant comprising removable containers of type A, type C, type D and type E.

FIG. 18 is a perspective view of the third mold holder variant shown in FIGS. 16, 17 and 19.

FIG. 19 is a bottom view of a mold with the third holder variant as shown in FIG. 16 and comprising removable containers of type A, type B and type C, arranged like those in FIG. 1 in the through-opening openings.

FIG. 20 is a perspective view of an exemplary embodiment of the mold according to the invention with a fourth holder variant comprising removable type A, type B and type C containers.

FIG. 21 is a perspective view of an exemplary embodiment of the mold according to the invention with the fourth holder variant comprising removable containers of type A, type C, type D and type E.

FIG. 22 is a bottom view of a mold with the fourth holder variant as shown in FIG. 20 and comprising removable containers of type A, type B and type C, arranged like those in FIG. 1 in the through-openings.

FIG. 23 is a sectional view of the fourth mold holder variant illustrated in FIGS. 20 to 22.

DESCRIPTION OF THE EMBODIMENTS

With reference to FIGS. 1 to 26, a mold 1 and variants thereof are proposed, intended for the preparation of food, in particular pastries, essentially comprising a holder 2 and at least one container 7.

Figure 1:
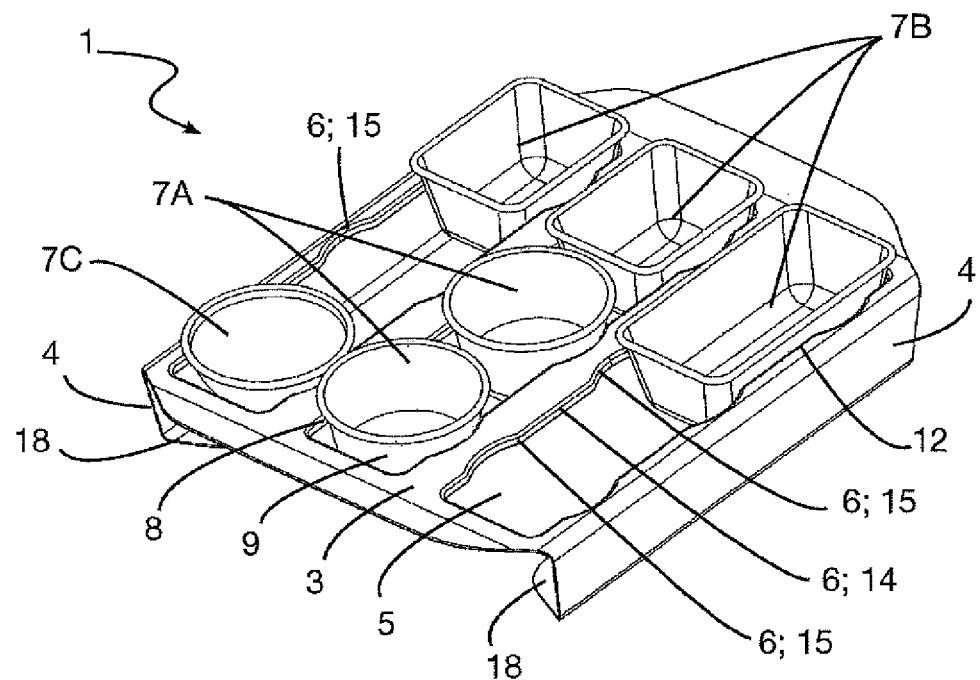
FIGS. 1 to 9 represent an exemplary embodiment of the mold according to the invention with a first holder variant.

FIG. 1 illustrates an exemplary mold according to the invention with a first holder variant. It involves a pastry mold 1, particularly for muffins and mini cakes. The mold 1 has a holder 2, the first variant, provided with a receiving structure 3, which is a receiving tray 3. The tray 3 has two enhancers 4 formed of two solid L-shaped walls, supporting the weight of the tray 3. The enhancers 4 are arranged laterally on each side of the holder 2 and have enhancer legs 18. The legs 18 are arranged in a plane parallel to the plane comprising the tray 3. The tray 3 has six containers 7 of different shapes: two muffin containers 7 of substantially frustoconical shape (type A), three different containers 7 substantially truncated pyramid in shape (type B), and a container 7 hemispherical in shape (type C). The containers 7 all have a border 8 at the end of the wall 9. The tray 3 has three openings 5, which according to the mold 1 in FIG. 1 are identical and substantially rectangular in shape. These openings 5 are through-openings and pass through the surface of the tray 3. The mold 1 has three openings 5 whose edge 6 of the same through-opening 5 has both straight portions 14 and curved portions 15; the three openings 5 of mold 1 are identical and each have six curved portions 15 and eight straight portions 14 arranged alternately; the curved parts 15 are adjacent to the straight portions 14 and arranged in the plane containing the receiving structure 3; the type A and C containers 7 may cooperate at a discontinuous line 12 of cooperation with the curved portions 15 and the type B containers 7 may cooperate at a discontinuous line 12 of cooperation with the straight portions 14 of the edge 6 of the through-opening 5 in order to partially support the containers 7 on the edge 6. These openings accommodate removable type A, B and C containers 7 of different shapes and volumes.

The discontinuous cooperation line 12 of each container 7 cooperates in part with the perimeter of the edge 6 of the opening 5 but sufficiently to retain the container 7. Thus, the through-opening 5 can receive the different types of type A or B container 7. It is thanks to the force of gravity that the containers 7 fit into the through-openings 5 and cooperate with the discontinuous line 12 of cooperation.

Figure 2:
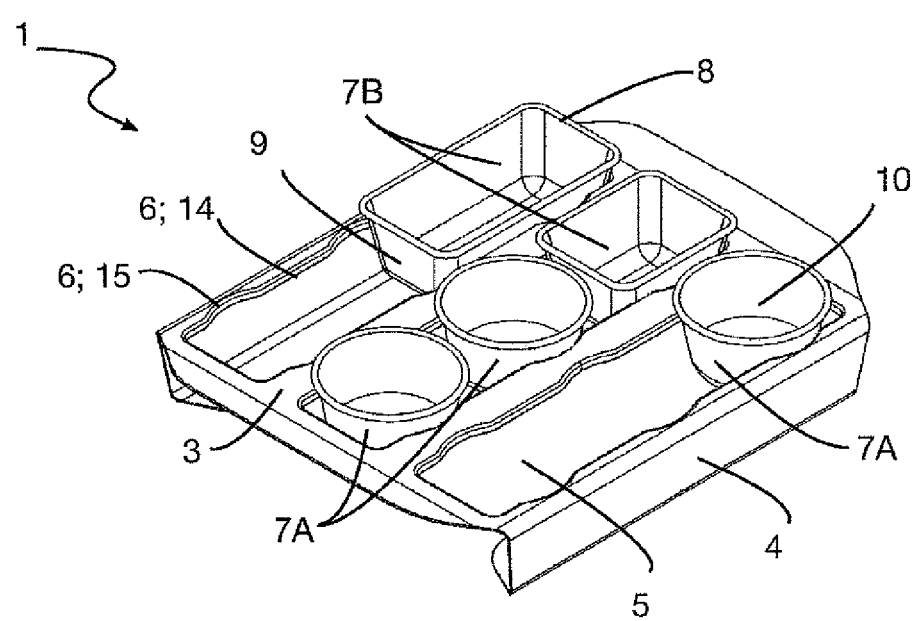

FIG. 2 illustrates a mold 1 according to the invention with the first holder variant 2 like that of FIG. 1 and comprising removable type A and type B containers 7, arranged differently in the through-openings 5 compared to FIG. 1. The tray 3 has five containers 7 of different shapes: two substantially frustoconical shaped muffin containers 7 (type A), and two different containers 7, of a substantially truncated pyramid shape (type B).

Figure 3:
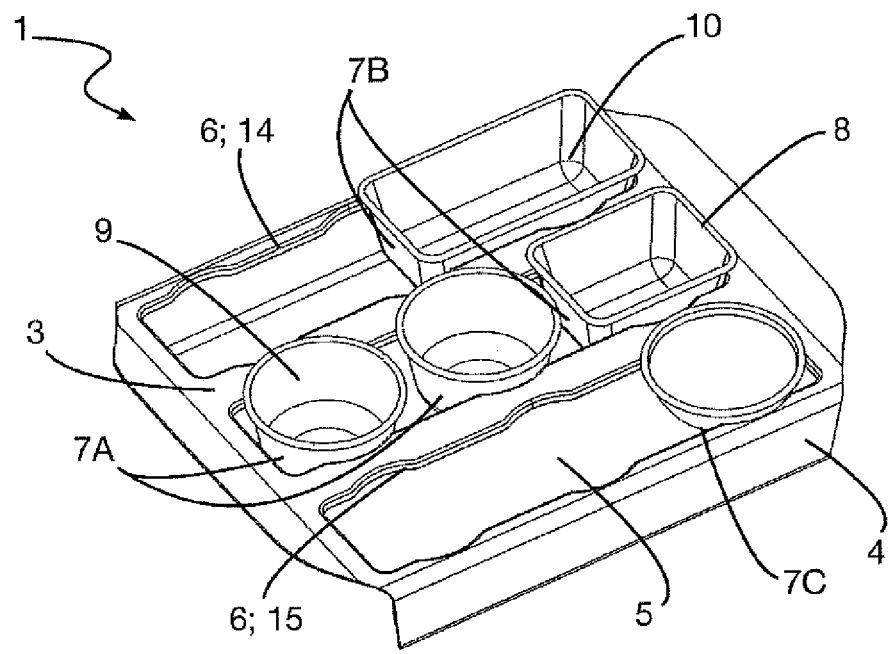

FIG. 3 illustrates a mold 1 according to the invention with the first holder variant 2 like that of FIG. 1, and comprising removable containers of type A, type B, type C, arranged differently in the through-openings compared to FIG. 1. The tray 3 has five containers 7 of different shapes: two substantially frustoconical shaped muffin containers 7 (type A), two different containers 7 of a substantially truncated pyramid shape (type B) and a hemisphere shaped container 7 (type C).

Figure 4:
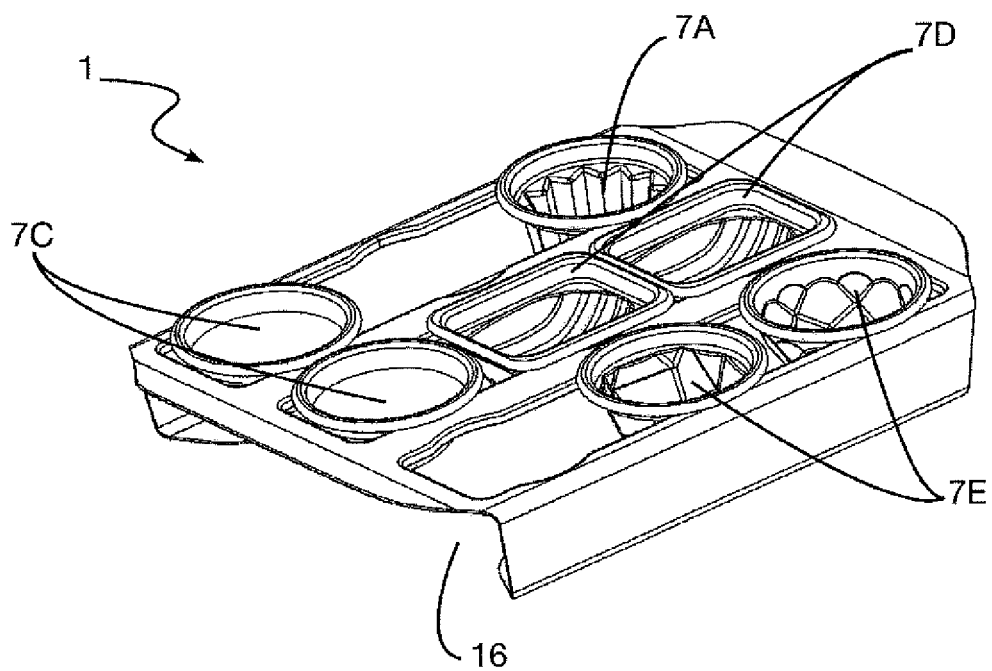

FIG. 4 illustrates a mold 1, which in comparison with that of FIGS. 1 to 3, has two additional types of container 7, types D and E. The mold 1 has an air circulation corridor 16, arranged under the receiving tray 3. The tray 3 and the enhancers 4, arranged facing one another on either side of the tray 3, define a corridor 16 allowing the air to move around the containers 7. The air is guided by the reception structure 3 and the enhancers 4.

The holder of mold 1 in FIG. 4 is identical to that in FIGS. 1 to 3 with three identical through-openings 5 and substantially rectangular in shape. The tray 3 has seven containers 7 of different shapes: a fluted container 7 substantially frustoconical in shape (type A), two madeleine containers 7 substantially ovoid in shape (type D), two different containers 7 in the shape of a hemisphere (type C) and two faceted containers 7 of substantially hemispherical shape (type E).

Figure 5:
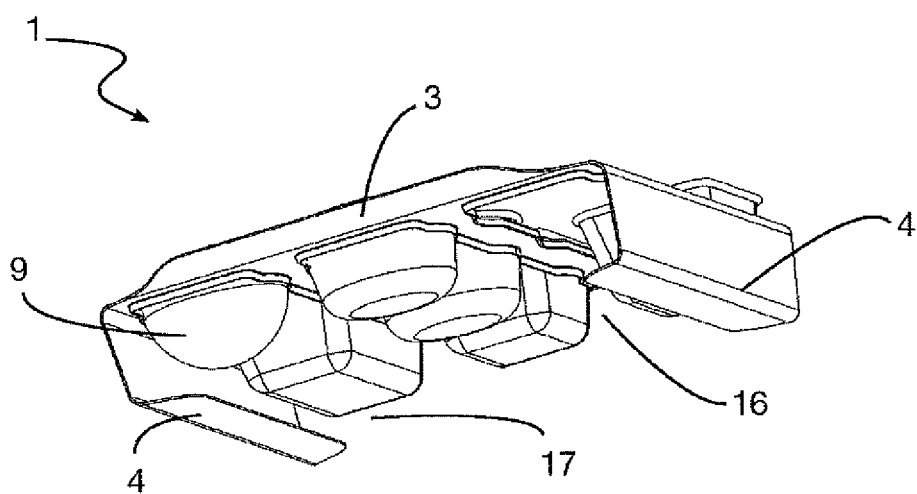

FIG. 5 is a bottom view of the mold depicted in FIG. 1. The hemispherical (type C) shaped container 7 is in the foreground. The mold 1 has an air circulation corridor 16 arranged under the receiving tray 3, and has a reservation zone 17 under each container 7. The reservation zone 17 of height h4 extends from the supporting surface of the worktop to the bottom wall 9 of the containers 7. This reservation zone 17 allows for the circulation of an air blade in the corridor 16, enabling the hot air to circulate better between the containers 7 and to provide slow, even baking without creating a local hot spot by contact with the bottom wall, which would cause burned spots due to overheating.

Figure 6:
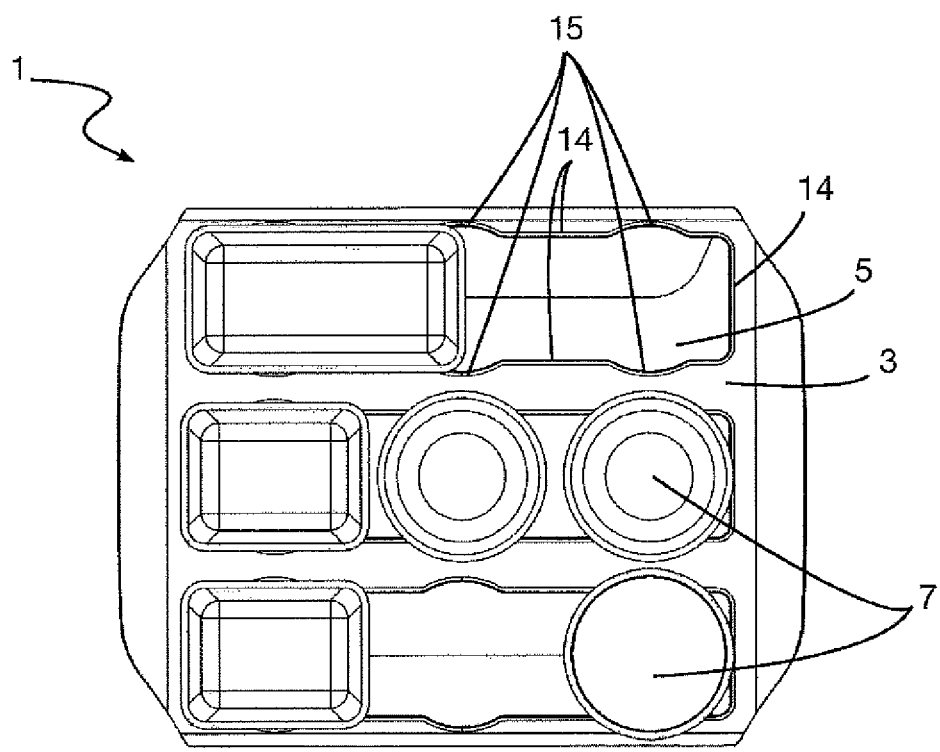

FIG. 6 is a top view of the mold depicted in FIG. 1.

Figure 7:
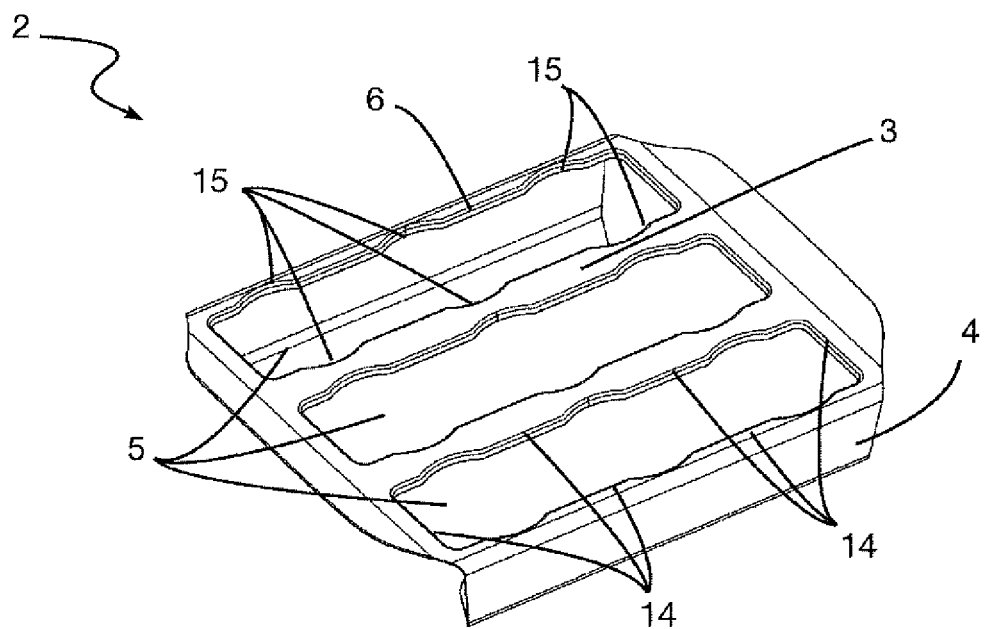

FIG. 7 is a perspective view of the first holder variant of the mold 1 illustrated in FIGS. 1 to 6. The mold 1 has three openings 5 whose edge 6 of the same through-opening 5 has both straight portions 14 and curved portions 15; the type A, C and E containers 7 may cooperate advantageously with the curved portions 15 and the type B and D containers 7 may cooperate advantageously with the straight portions 14 of the edge 6 of the through-opening 5 in order to partially support the containers 7 on the edge 6.

Figure 8:
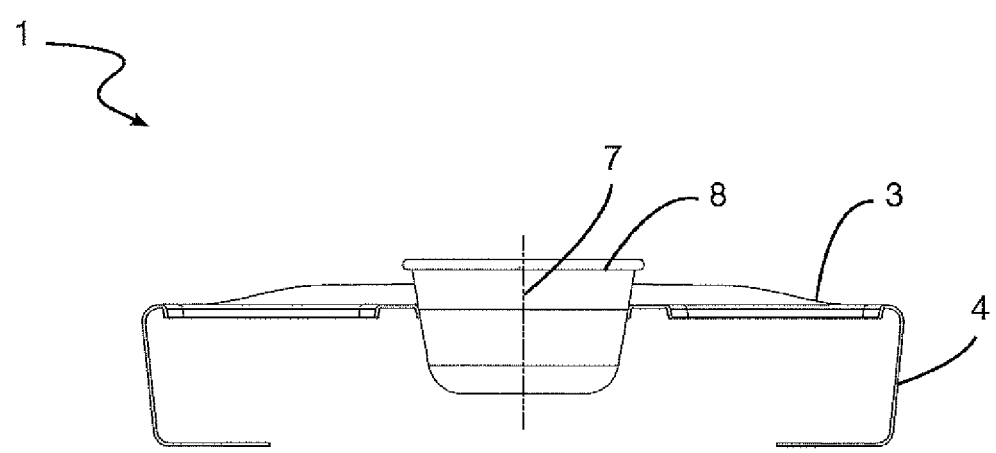

FIG. 8 is a sectional view of the first variant of the holder 2 of the mold 1 shown in FIGS. 1 to 6. The enhancers 4 have an L-shaped section improving the stability of the holder 2.

Figure 9:
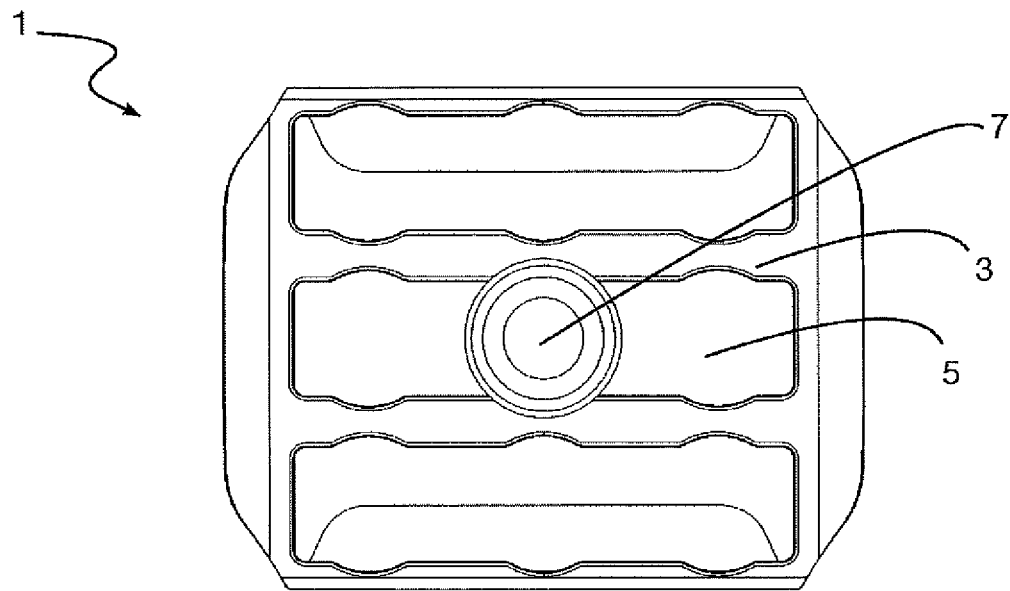

FIG. 9 is a top view of the first holder variant 2 of the mold 1 illustrated in FIGS. 1 to 6.

FIGS. 10 to 15 represent an exemplary embodiment of the mold according to the invention with a second holder variant.

Figure 10:
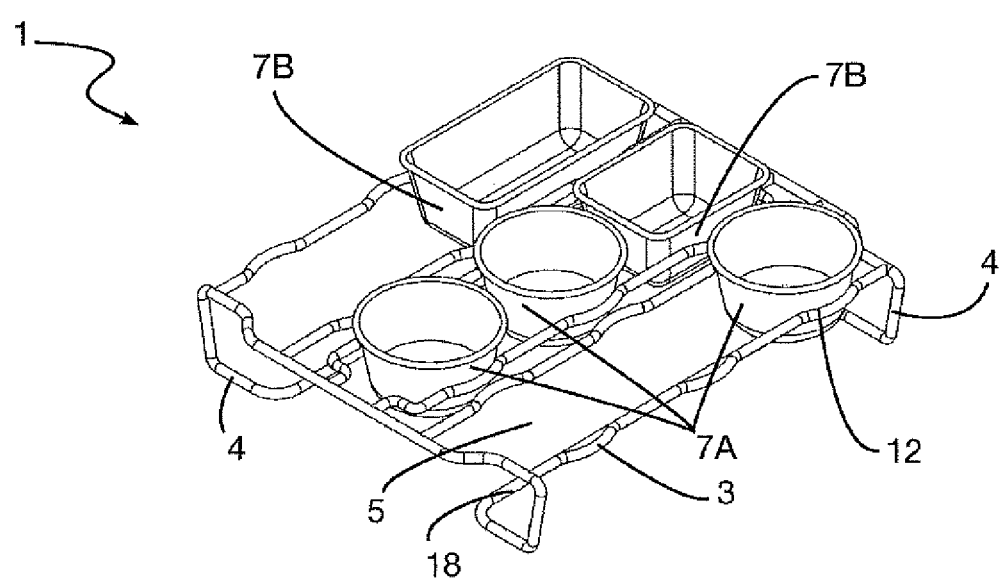
FIGS. 10 to 15 represent an exemplary embodiment of the mold according to the invention with a second holder variant.

FIG. 10 illustrates a mold 1 according to the invention with the same arrangement of containers 7 as in FIG. 2 but with a second holder variant 2 comprising removable type A and type B containers 7.

The holder 2 is made from a metal wire. This wire is arranged according to various bends making it possible to produce the enhancers 4 and the enhancer legs 18, which are feet formed by the wire, and enabling the tray 3 to be produced.

In this variant, the tray 3 is recessed between the metal wire parts. The tray 3 has five different shaped containers 7: three muffin containers 7 (type A) of substantially frustoconical shape and two different containers 7 substantially of a truncated pyramid shape with parallelepipedal, square (type B), and rectangular (type B) base.

The mold 1 has three openings 5 whose edge 6 of the same through-opening 5 has both straight portions 14 and curved portions 15. The three openings 5 of the mold 1 are identical and each has six curved portions 15 and eight straight portions 14 arranged alternately; the curved portions 15 are adjacent to the straight portions 14 and are arranged in the plane containing the receiving structure 3; the type A containers 7 may cooperate at a discontinuous line 12 of cooperation with the curved portions 15 and the type B containers 7 may cooperate at a discontinuous line 12 of cooperation with the straight portions 14 of the edge 6 of the through-opening 5 in order to partially support the containers 7 on the edge 6.

The tray 3 has three openings 5, which according to the mold 1 in FIG. 10 are identical and substantially rectangular in shape.

These openings 5 are through-openings and pass through the surface of the tray 3. These openings enable removable type A and type B containers 7 of different shapes and volumes to be accommodated.

Figure 11:
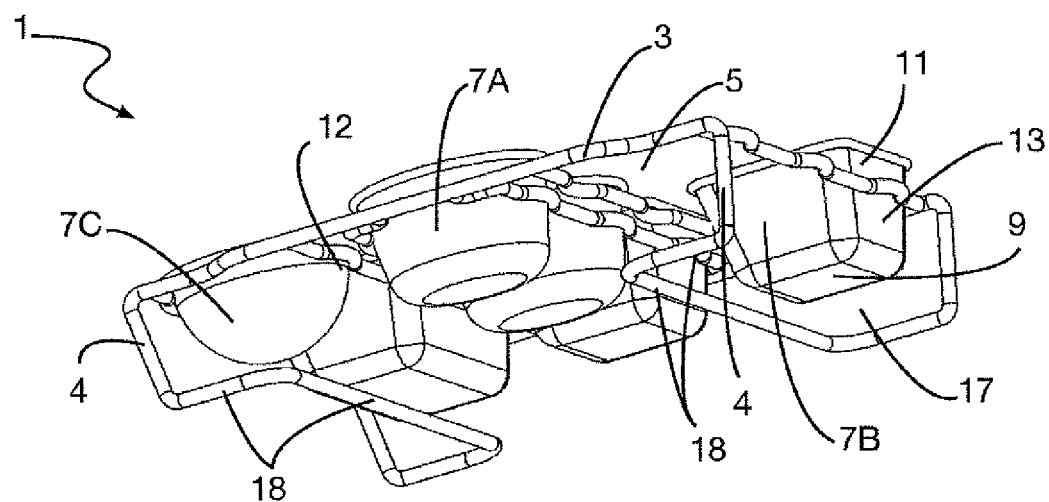

FIG. 11 is a bottom view of the mold shown in FIG. 10, but illustrated with different layouts of the type A, C, D and E containers in the through-openings 5. The containers 7 cooperate at about ⅓ of their height with the edge 6 of the openings 5. An upper gripping zone 11 is advantageously located above the tray 3, and a lower stability zone 13 is located below the tray 3. The center of gravity of the containers 7 is located above the tray 3. A discontinuous line of cooperation 12 is located at the joint between the upper gripping zone 11 and the lower stability zone 13. The mold 1 has a reservation zone 17 under each lower stability zone 13 of the containers 7. The reservation zone 17 of height h4 extends from the enhancer leg 18 to the bottom wall 9 of the containers 7.

Figure 12:
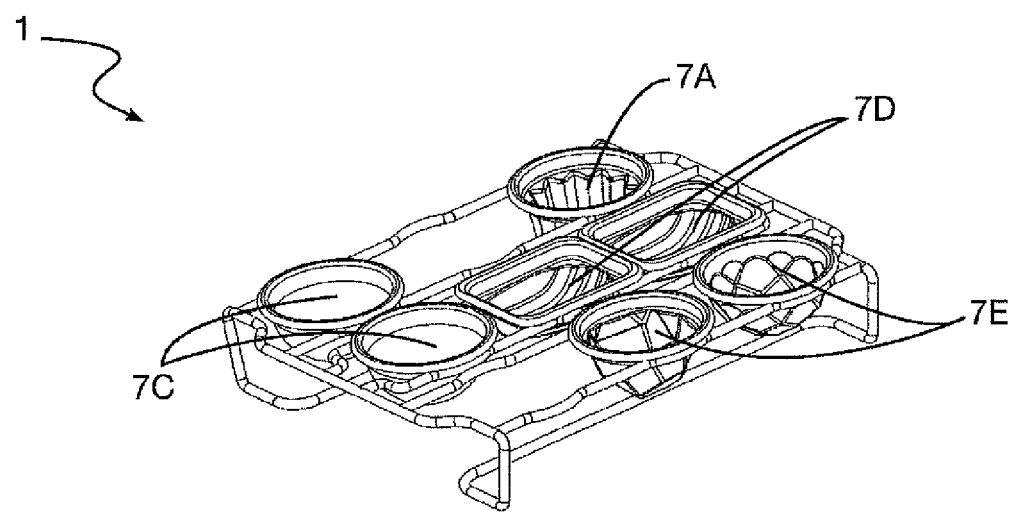

FIG. 12 is a perspective view of a mold 1 according to the invention with a second holder variant comprising removable containers of type A, type B, type C, type D and type E. The variant of the holder 2 of FIG. 12 is identical to the holder of FIGS. 10 and 11.

The tray 3 has seven containers 7 of different shapes: two muffin containers 7 of a substantially frustoconical shape (type A), one fluted container 7 of a substantially frustoconical shape (type A), two madeleine containers 7 of a substantially ovoid shape (type D) and two different faceted containers 7 hemispherical in shape (type E).

Figure 13:
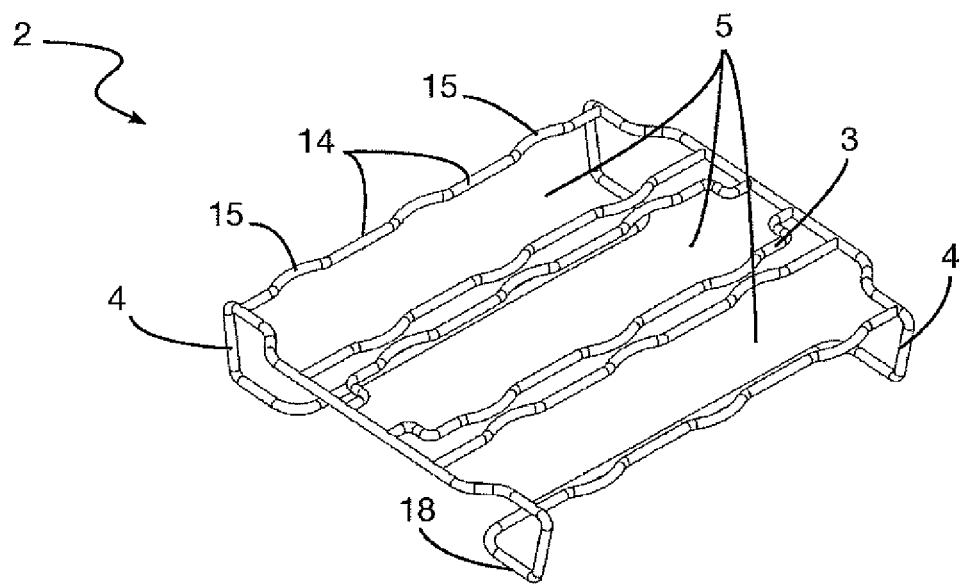
Figure 14:
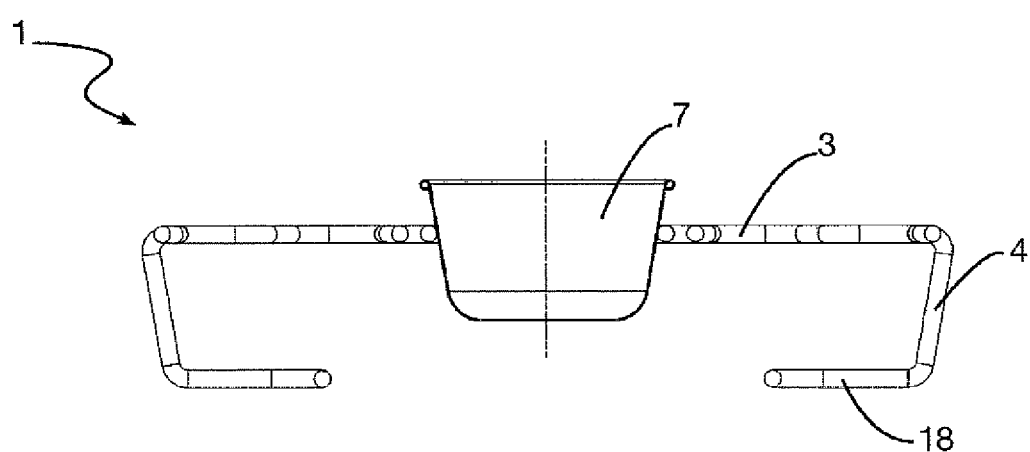

FIGS. 13 and 14 illustrate the second variant of the mold holder 2 illustrated in FIGS. 10, 11, 12 and 15. The mold 1 has three openings 5 whose edge 6 of the same through-opening 5 has both straight portions 14 and curved portions 15. The type A, C and E containers 7 may cooperate advantageously with the curved portions 15 and the type B and D containers 7 may cooperate advantageously with the straight portions 14 of the edge 6 of the through-opening 5 in order to partially support the containers 7 on the edge 6.

Figure 15:
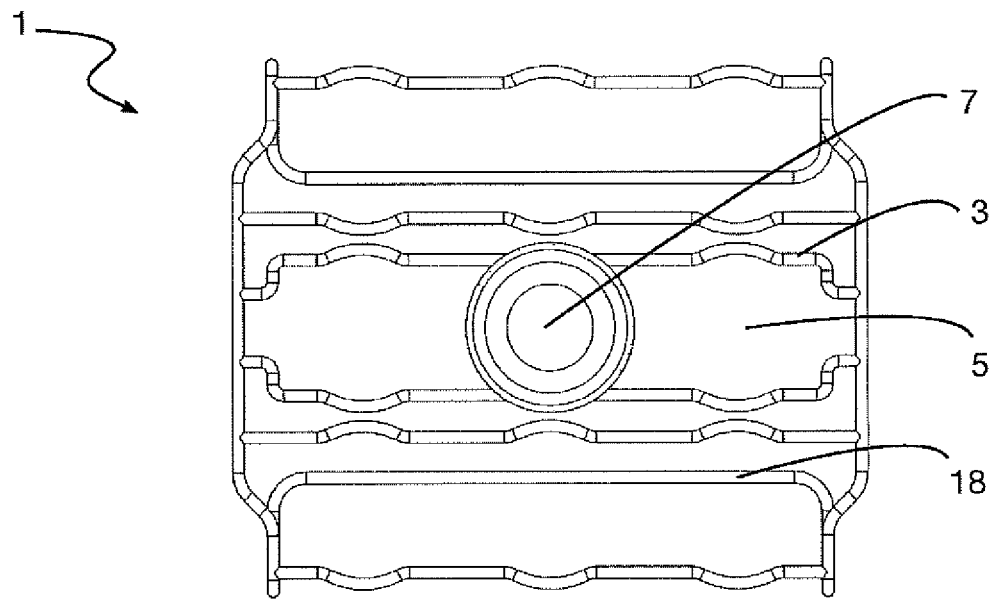

FIG. 15 is a top view of the second mold holder variant shown in FIGS. 10 to 14. The curved portions 15 are adjacent to the straight portions 14 and arranged in the plane containing the receiving structure 3; the container 7 is supported by 2 curved portions 15 arranged opposite each other in the central opening 5.

Figure 16:
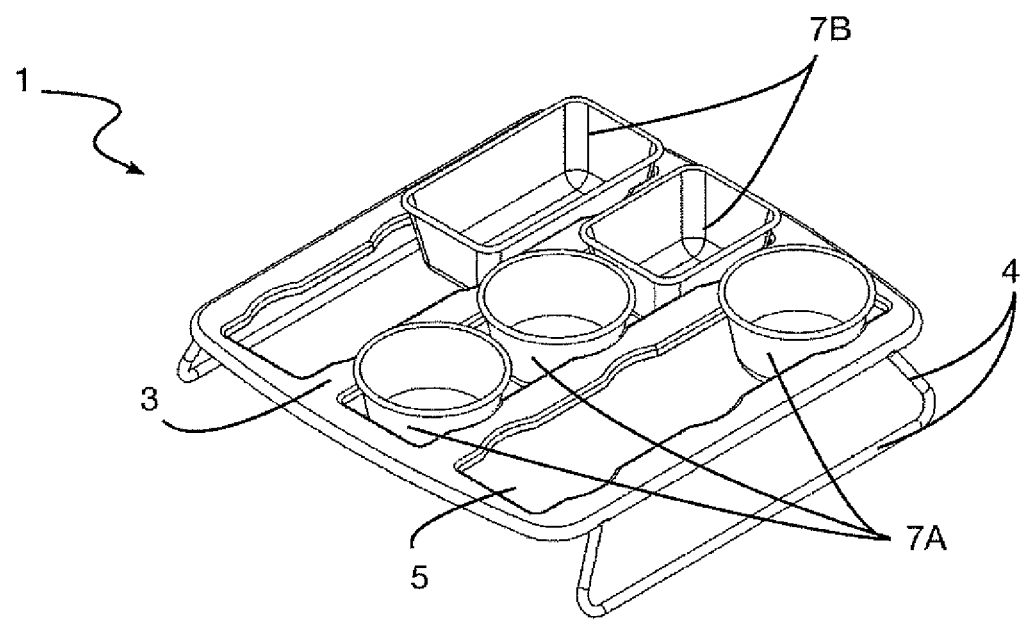
FIGS. 16 to 19 represent an exemplary embodiment of the mold according to the invention with a third holder variant.

FIG. 16 illustrates a mold 1 according to the invention with the same arrangement of containers 7 as in FIG. 2 but with a third holder variant 2 comprising removable type A and type B containers 7. The holder 2 is made from a solid metal tray 3 and metal wire enhancers 4, which are feet formed by the wire. The enhancers 4 are arranged laterally on each side of the holder 2.

In this variant, the tray 3 is solid, unlike that in FIG. 10. The tray 3 has five different shaped containers 7: three muffin containers 7 (type A) of substantially frustoconical shape and two different containers 7 substantially of a truncated pyramid shape with parallelepipedal, square (type B), and rectangular (type B) base.

The mold 1 has three openings 5 whose edge 6 of the same through-opening 5 has both straight portions 14 and curved portions 15. The type A containers 7 may cooperate at a discontinuous line 12 of cooperation with the curved portions and the type B containers 7 may cooperate at a discontinuous line 12 of cooperation with the straight portions 14 of the edge 6 of the through-opening 5 in order to partially support the containers 7 on the edge 6.

Figure 17:
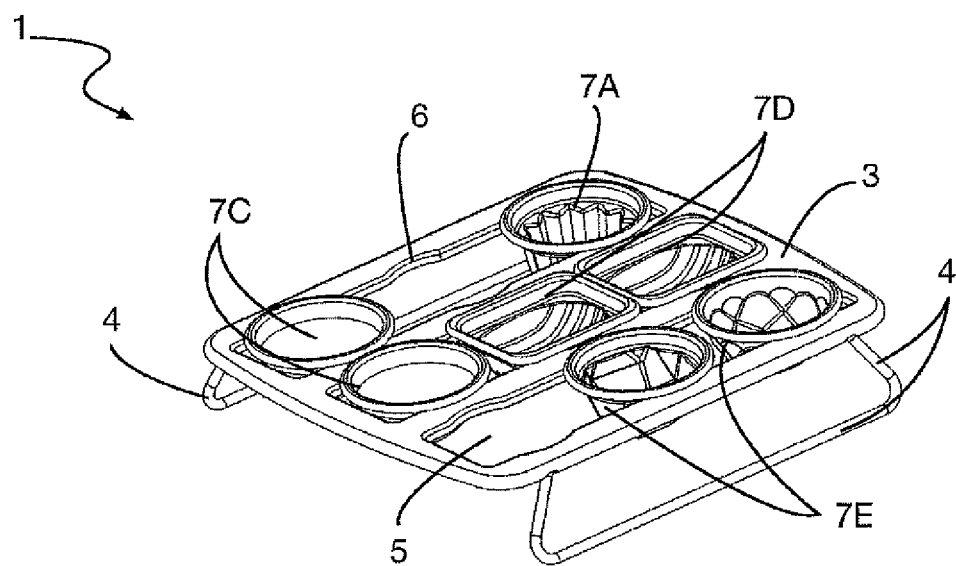

FIG. 17 illustrates the mold 1 with the third holder variant comprising removable containers of type A, type B, type C, type D and type E.

Figure 18:
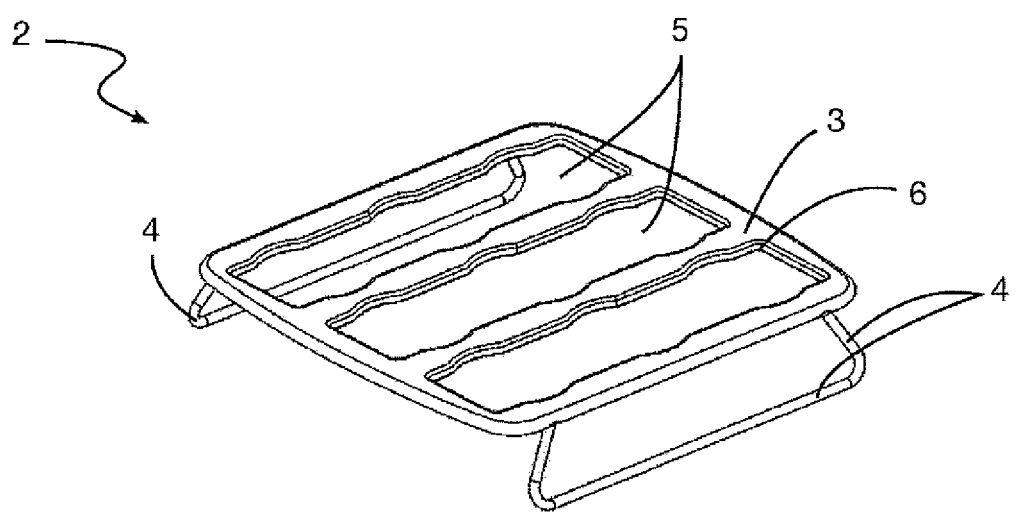
Figure 19:
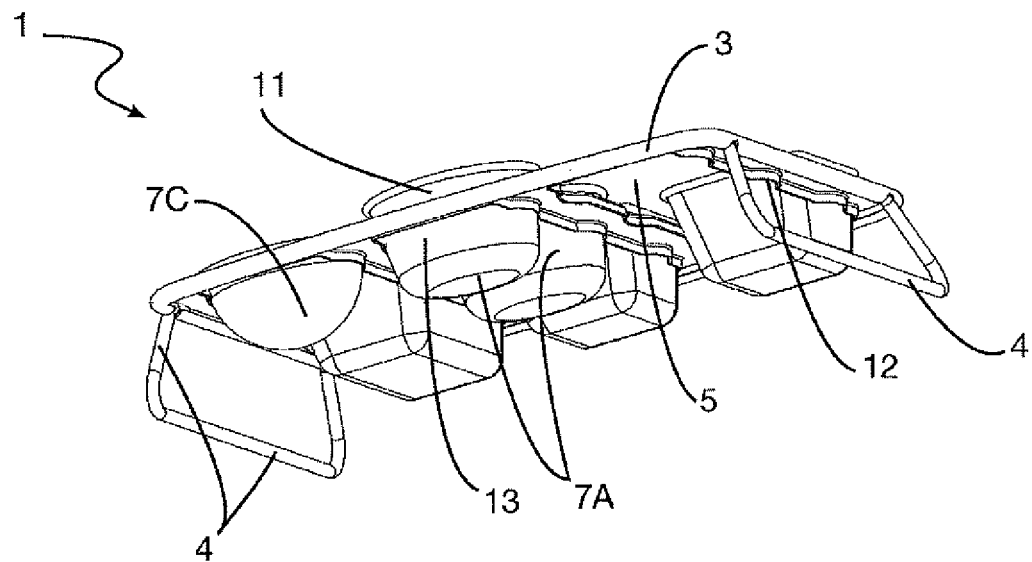

FIG. 18 illustrates the third holder variant 2 of the mold illustrated in FIGS. 16, 17 and 19. The mold 1 has three openings 5 whose edge 6 of the same through-opening 5 has both straight portions 14 and curved portions 15. The type A, C and E containers 7 may advantageously cooperate with the curved portions 15 and the type B and D containers 7 may advantageously cooperate with the straight portions 14 of the edge 6 of the through-opening 5 in order to partially support the containers 7 on the edge 6.

FIG. 19 is a bottom view of the mold 1 with the third holder variant 2 shown in FIG. 16, but illustrated with a different arrangement, that of FIG. 1, i.e., type A, B and C containers in the through-openings 5. The containers 7 cooperate at about ⅓ of their height with the edge 6 of the openings 5. An upper gripping zone 11 is advantageously located above the tray 3, and a lower stability zone 13 is located below the tray 3. The center of gravity of the containers 7 is located above the tray 3. A discontinuous line of cooperation 12 is located at the joint between the upper gripping zone 11 and the lower stability zone 13.

Figure 20:
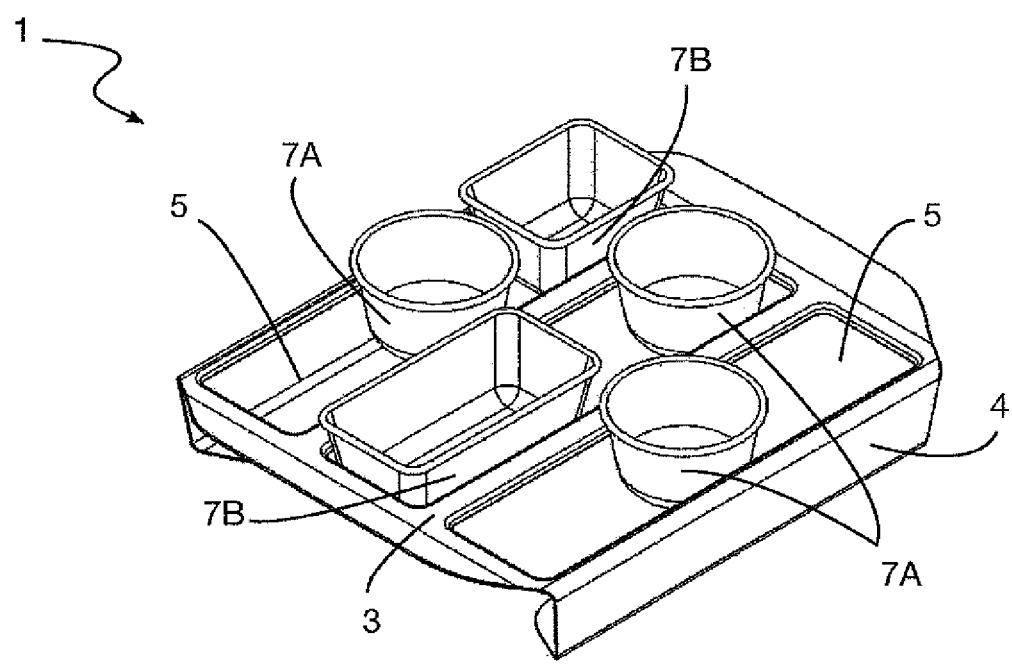
FIGS. 20 to 23 represent an exemplary embodiment of the mold according to the invention with a fourth holder variant.

FIG. 20 illustrates a mold 1 according to the invention with a fourth variant of the holder 2 comprising removable type A and type B containers 7. The holder 2 has the same tray 3 and the same enhancers as the holder 2 of the first variant (see FIGS. 1 to 9). However, the mold 1 according to this fourth variant has three openings 5 whose edge 6 of the same through-opening 5 only has straight portions 14 of the edge 6 of the through-opening 5 in order to partially support the containers 7 on the edge 6. Type A and type B containers are supported on the edge 6 straight 14 of the through-opening 5.

Figure 21:
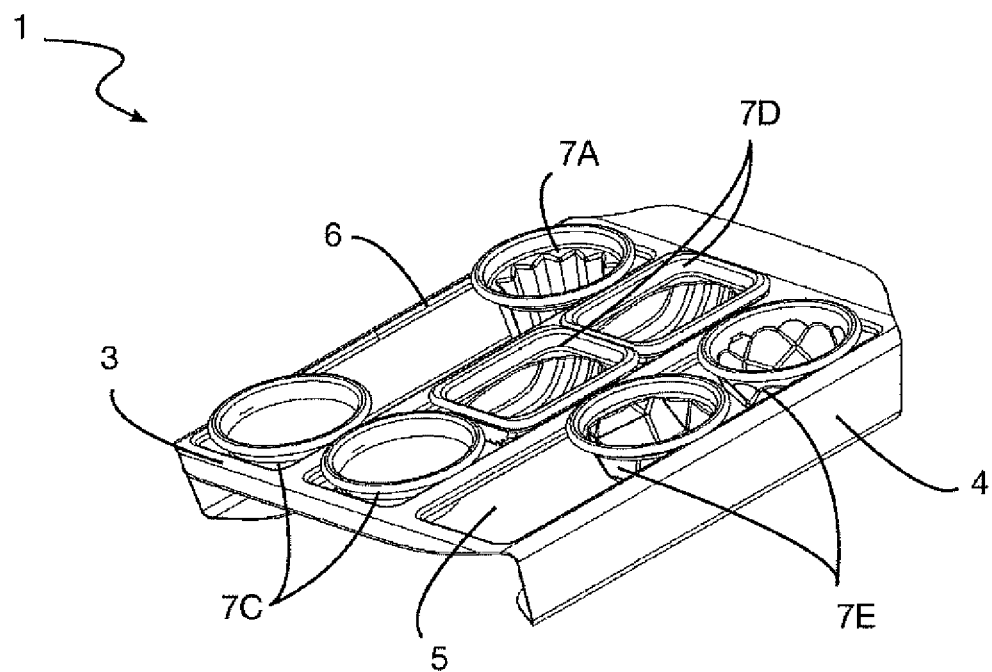

FIG. 21 illustrates a mold 1, which in comparison with that of FIG. 20, has two additional types of container 7, types D and E. The mold holder 1 of FIG. 21 is identical to that of FIG. 20 with three identical through-openings 5 rectangular in shape. The tray 3 has seven containers 7 of different shapes: a fluted container 7 substantially frustoconical in shape (type A), two madeleine containers 7 substantially ovoid in shape (type D), two different containers 7 hemispherical in shape (type C) and two faceted containers 7 substantially hemispherical in shape (type E)

Figure 22:
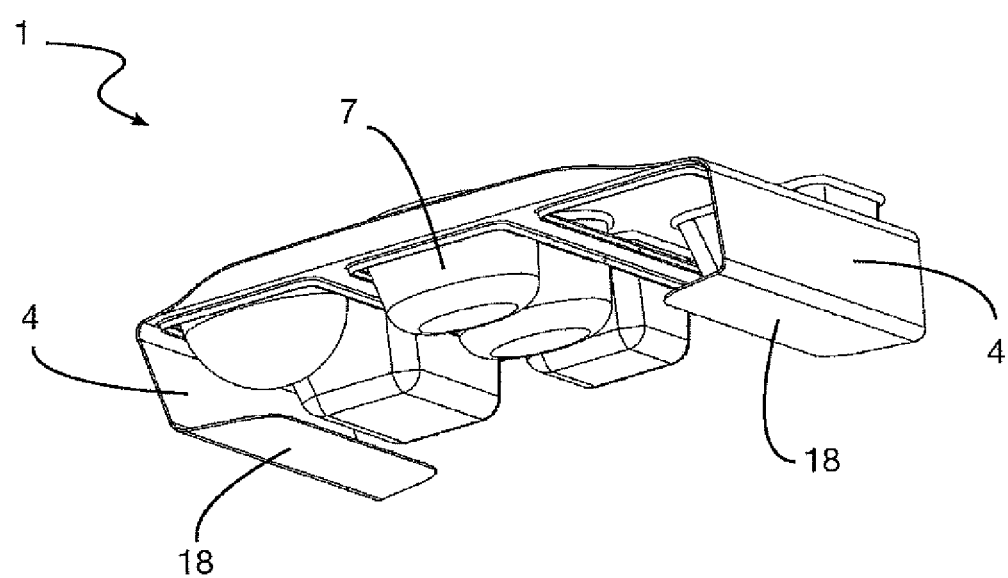

FIG. 22 is a bottom view of the mold 1 with the fourth variant of the holder 2 shown in FIG. 20, but illustrated with a different arrangement, that of FIG. 1, i.e., type A, B and C containers in the through-openings 5. The containers 7 cooperate at about ⅓ of their height with the edge 6 of the openings 5. An upper gripping zone 11 is advantageously located above the tray 3, and a lower stability zone 13 is located below the tray 3. The center of gravity of the containers 7 is located above the tray 3. A discontinuous line of cooperation 12 is located at the joint between the upper gripping zone 11 and the lower stability zone 13. The receiving holder is a tray 3 comprising enhancers 4, the section of which is L-shaped, having enhancer legs 18. The legs 18 are in contact with the worktop or the baking tray and thus improve the stability of the mold when it is placed on a surface. The legs 18 are arranged in a plane parallel to the plane of the tray 3.

Figure 23:
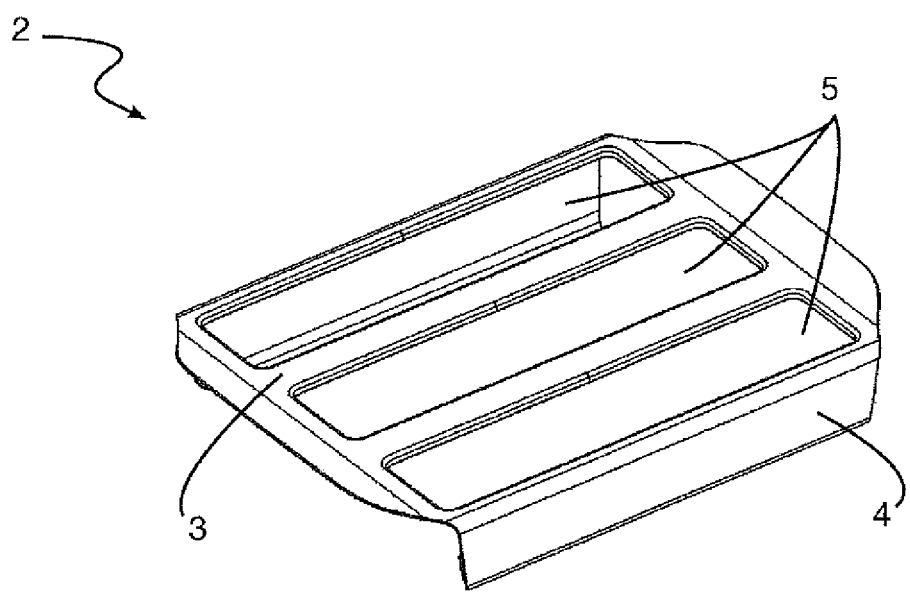

FIG. 23 illustrates the fourth variant of the holder 2 of the mold illustrated in FIGS. 20, 21 and 22. The mold 1 has three openings 5 whose edge 6 of the same through-opening 5 has only straight portions 14. The containers 7 of any type may cooperate advantageously with the straight portions 14 of the edge 6 of the through-opening 5 in order to partially support the containers 7 on the edge 6.

Figure 24:
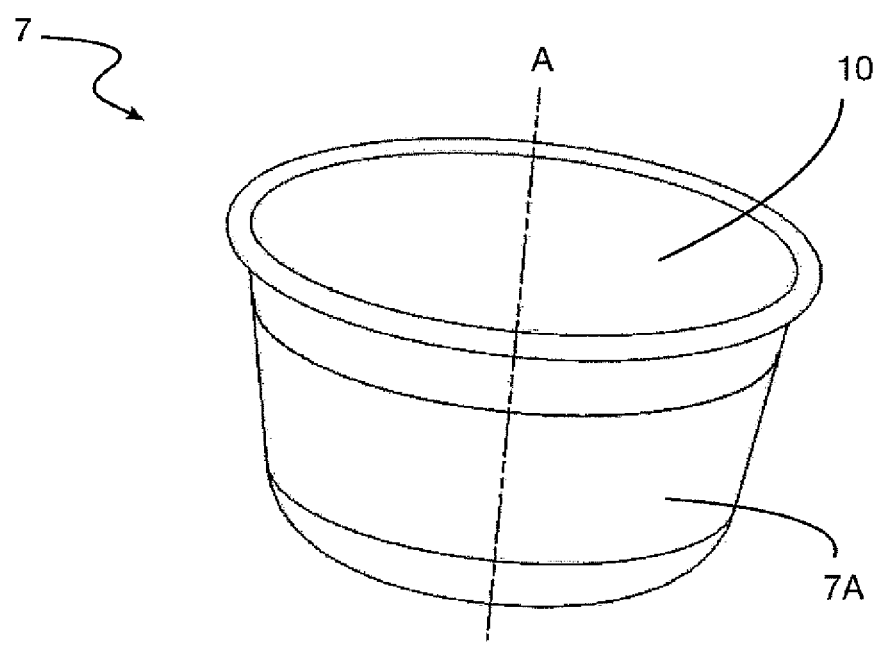
FIG. 24 is a perspective view of an example of a container used in the mold according to the invention.

FIG. 24 illustrates an example of a container 7 of height h used in the mold 1 of the preceding FIGS. 1 to 22. This container 7 has a gripping zone and a lower stability zone. At about ⅓ of the height of the container, starting from its top edge, the container 7 has a discontinuous line of cooperation 12. The gripping zone, of height h1, is advantageously located above the discontinuous line. The lower stability zone, of height h2, is advantageously located below the discontinuous line. The container 7 also has a side wall 9 and a bottom wall 9 forming a cavity 10. The container 7 has a height h1 of about 30% of the total height h of the container 7.

The discontinuous cooperation line 12 defines the joint between the upper and lower zones.

Figure 25:
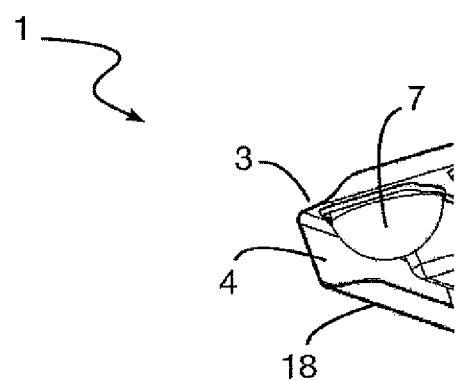
FIG. 25 is a partial perspective view of a fourth exemplary embodiment of a mold according to the invention.

FIG. 25 illustrates in part a fourth exemplary embodiment of a mold 1 according to the invention. The receiving holder is a tray 3 comprising L-shaped enhancers 4, having enhancer legs 18. The legs 18 are in contact with the worktop or the baking tray and thus improve the stability of the mold when it is placed on a surface.

Figure 26:
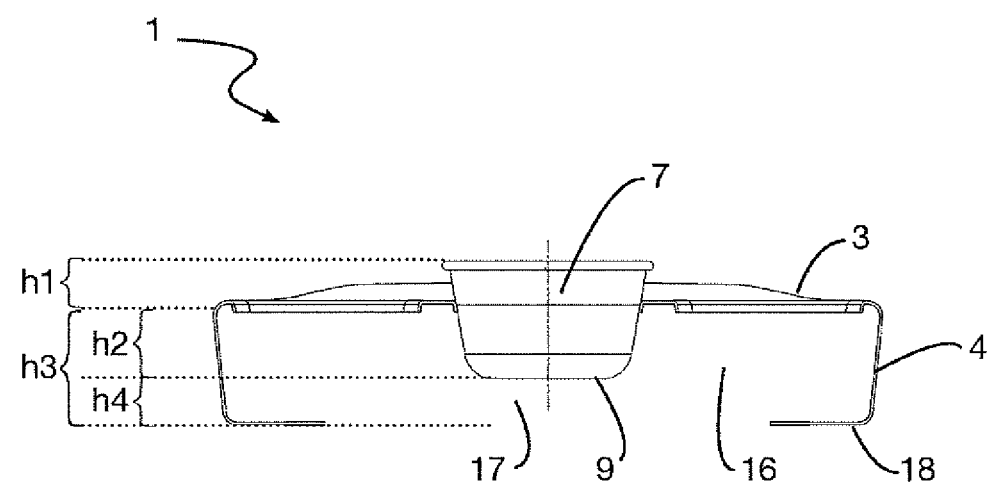
FIG. 26 is a sectional view of a mold according to a fifth exemplary embodiment according to the invention.

FIG. 26 illustrates in part a fifth exemplary embodiment of a mold 1 according to the invention. The receiving holder is a tray 3 comprising enhancers 4, of L-shaped section, having enhancer legs 18. The legs 18 are arranged in a plane parallel to the plane of the tray 3. The enhancers 14 have a height h3, which is greater than the height h2, h2 representing approximately ⅓ of h3. The mold 1 has a reservation zone 17 of height h4 that extends from the worktop to the bottom wall 9. The height h3 corresponds to the sum of heights h2+h4. This reservation zone 17 is an empty zone, for air circulation enabling the hot air to circulate better among the containers 7 and to provide slow, even baking without creating a local hot spot by contact with the bottom wall, which would cause burned spots due to overheating.

Under conditions of use, a user may, for example, grasp containers 7 of different types, madeleine or muffin or cake or other, in order to pour an identical or different food preparation into them. The user will grasp each container 7 by its gripping zone 11 or by the side wall 9 and fill the cavity 10 with the food preparation. The user will then place the filled containers in any opening 5 of the tray 3 at any place of the opening 5, approximately along the direction of a longitudinal axis (A). The container 7 then comes into contact with the edge 6 of the openings 5 and when the discontinuous line 12 comes into contact with the edge 6, said line cooperates with the edge 6 and stops the longitudinal movement of the container 7. The user can then release the container 7 and repeat this operation for each container in order to fill all the openings 5 of the mold 1. The user can also push a container or slide a container into the opening 5.

Depending on the recipe followed, the user can heat the mold 1 or chill it. The specific characteristics of the connection between the container 7 and the openings 5 make it possible to guarantee the stability of the mold 1 assembly, holder and containers, under conditions of expansion (baking) or contraction (chilling) of the mold 1. When the baking or chilling is done, the user can disassemble the containers 7 from the holder 2 by easily grasping them by their gripping zone, pulling upwards in the direction of the longitudinal axis (A). The containers are thus removed from the holder 2. The user can then unmold the food preparation (for example, the cake) with no risk of damaging it. This results in food of different shapes baked in the same mold.

Although the invention has been described in relation to particular exemplary embodiments and applications, it is obviously in no way limited thereto.

Changes can still be made, particularly with regard to the arrangement and constitution of the various elements or by substituting equivalent techniques, without departing from the field of protection of the invention.

The invention claimed is:

1. A mold for preparing food, in particular pastries, comprising:
   a holder comprising a receiving structure, enhancers and at least one through-opening having an edge;
   at least one removable type A container intended to be inserted into the at least one through-opening;
   at least one removable type B container intended to be inserted into the at least one through-opening;

each of the at least one removable type A container and at least one removable type B containers comprising a border and a wall together forming a cavity for holding food;

the at least one removable type A container and the at least one removable type B containers are of different geometry and have cavities of different volumes;

wherein the edge of each of the at least one through-opening has both straight portions and curved portions, the at least one removable type A containers is configured to cooperate with the straight portions and the at least one removeable type B containers is configured to cooperate with the curved portions of the edge of each of the at least one through-opening in order to partially support the respective containers on the edge.

2. The mold according to claim 1, wherein the straight portions and the curved portions are present simultaneously on the edge of each of the at least one through-opening.

3. The mold according to claim 1, wherein the edge of each of the at least one through-opening has at least four of the straight portions alternating with at least four of the curved portions.

4. The mold according to claim 1, wherein the curved portions are concave.

5. The mold according to claim 1, wherein the wall of each of the at least one removable type A container or the at least one removable type B container has a discontinuous line of cooperation where a part of the respective container cooperates with a part of the edge of the at least one through-opening, in order to place the respective container partially in contact with the edge.

6. The mold according to claim 1, wherein the at least one removable type A container or the at least one removeable type B containers has a parallelepipedal section.

7. The mold according to claim 1, wherein the at least one removable type A container or the at least one removable type B containers has at least a partly circular section.

8. The mold according to claim 1, wherein the at least one removable type B containers has a circular section configured to cooperate only with the curved portions.

9. The mold according to claim 1, wherein the at least one through-opening can simultaneously receive the at least one removable type A container, the at least one removable type B container, and other types of containers.

10. The mold according to claim 1, wherein the at least one through-opening comprises at least two through-openings, each receiving the at least one removable type A containers having a parallelepipedal section or the at least one removable type B containers having at least a partly circular section.

11. The mold according to claim 1, wherein each of the at least one removable type A container and the at least one removable type B container has a tapering cross-section, between a minimum and a maximum, covering a variable area along a longitudinal axis of the respective container, such that each container has a substantially frustoconical, spherical or truncated pyramid geometry.

12. The mold according to claim 1, wherein the receiving structure is a tray.

13. The mold according to claim 1, wherein the holder and the at least one removable type A container and the at least one removable type B containers are made of steel.

14. The mold according to claim 1, wherein the receiving structure and the enhancers are the same continuous element.

* * * * *